(12) United States Patent
Kotliar

(10) Patent No.: US 7,931,733 B2
(45) Date of Patent: *Apr. 26, 2011

(54) METHOD OF PRODUCING HYPOXIC ENVIRONMENTS IN OCCUPIED COMPARTMENTS WITH SIMULTANEOUS REMOVAL OF EXCESSIVE CARBON DIOXIDE AND HUMIDITY

(76) Inventor: Igor K. Kotliar, New York, NY (US)

( * ) Notice: Subject to any disclaimer, the term of this patent is extended or adjusted under 35 U.S.C. 154(b) by 478 days.

This patent is subject to a terminal disclaimer.

(21) Appl. No.: 12/075,541

(22) Filed: Mar. 12, 2008

(65) Prior Publication Data

US 2008/0210240 A1 Sep. 4, 2008

Related U.S. Application Data

(63) Continuation-in-part of application No. 10/726,737, filed on Dec. 3, 2003, now Pat. No. 7,900,709, and a continuation-in-part of application No. 11/183,948, filed on Jul. 19, 2005, and a continuation-in-part of application No. 11/199,770, filed on Aug. 8, 2005, now Pat. No. 7,207,392, and a continuation-in-part of application No. 09/750,801, filed on Dec. 28, 2000, now Pat. No. 6,418,752, and a continuation-in-part of application No. 09/854,108, filed on May 11, 2001, now Pat. No. 6,401,487, and a continuation-in-part of application No. 09/551,026, filed on Apr. 17, 2000, now Pat. No. 6,314,754, and a continuation-in-part of application No. 08/858,099, filed on May 17, 1997, now Pat. No. 5,887,439, and a continuation-in-part of application No. 08/505,621, filed on Jul. 21, 1995, now Pat. No. 5,799,652.

(51) Int. Cl.
*A62C 2/00* (2006.01)
*B01D 50/00* (2006.01)
(52) U.S. Cl. ............... 95/8; 95/10; 95/19; 95/22; 95/14; 95/45; 95/96; 96/417; 96/420; 96/421; 96/4; 96/109; 55/385.2; 128/205.26; 128/205.12; 128/205.28; 128/205.11
(58) Field of Classification Search ............... 55/385.2, 55/DIG. 19, DIG. 29, DIG. 46; 454/187, 454/253; 95/12, 54, 47; 99/467, 476; 422/3; 62/63, 78, 179, 239, 404, 640, 28, 643; 169/45, 169/56, 61, 43, 54; 426/418, 419; 252/2; 128/205.26, 205.11, 202.12, 200.24, 204.18, 128/204.21; 600/21
See application file for complete search history.

(56) References Cited

U.S. PATENT DOCUMENTS

| 4,807,706 A | | 2/1989 | Lambertsen et al. | |
|---|---|---|---|---|
| 4,896,514 A | * | 1/1990 | Sugiyama et al. | ............... 62/404 |
| 5,063,753 A | * | 11/1991 | Woodruff | ......................... 62/239 |

(Continued)

OTHER PUBLICATIONS

U.S. Appl. No. 10/726,737, Igor K. Kotliar.

(Continued)

*Primary Examiner* — Duane Smith
*Assistant Examiner* — Minh-Chau Pham
(74) *Attorney, Agent, or Firm* — Igor K. Kotliar

(57) ABSTRACT

A method and a system for providing a hypoxic environment inside an enclosed compartment with simultaneous removal of carbon dioxide and moisture produced by occupants; said method and system designed for fire prevention and for simulated altitude training, wellness and hypoxic therapy, including equine and other animal applications.

18 Claims, 1 Drawing Sheet

U.S. PATENT DOCUMENTS

| | | | |
|---|---|---|---|
| 5,355,781 A * | 10/1994 | Liston et al. | 99/476 |
| 5,360,372 A * | 11/1994 | Newman et al. | 454/253 |
| 5,388,413 A * | 2/1995 | Major et al. | 62/640 |
| 5,437,837 A * | 8/1995 | Olson et al. | 422/3 |
| 5,472,480 A * | 12/1995 | Barbe | 95/54 |
| 5,515,693 A * | 5/1996 | Cahill-O'Brien et al. | 62/179 |
| 5,649,995 A * | 7/1997 | Gast, Jr. | 95/12 |
| 5,799,495 A * | 9/1998 | Gast et al. | 62/78 |
| 5,799,652 A | 9/1998 | Kotliar | |
| 5,887,439 A | 3/1999 | Kotliar | |
| 5,921,091 A * | 7/1999 | Foss et al. | 62/63 |
| 5,964,222 A | 10/1999 | Kotliar | |
| 6,314,754 B1 | 11/2001 | Kotliar | |
| 6,401,487 B1 | 6/2002 | Kotliar | |
| 6,418,752 B2 | 7/2002 | Kotliar | |
| 7,207,392 B2 | 4/2007 | Kotliar | |

OTHER PUBLICATIONS

U.S. Appl. No. 11/183,948, Igor K. Kotliar.

* cited by examiner

METHOD OF PRODUCING HYPOXIC ENVIRONMENTS IN OCCUPIED COMPARTMENTS WITH SIMULTANEOUS REMOVAL OF EXCESSIVE CARBON DIOXIDE AND HUMIDITY

This application is a continuation in part of the U.S. Ser. No. 10/726,737; U.S. Ser. Nos. 11/183,948, 11/199,770, 09/750,801, 09/854,108, 09/551,026, 08/858,099 and 08/505,621, now U.S. Pat. Nos. 7,207,392; 6,418,752; 6,401,487; 6,314,754; 5,964,222; 5,887,439 and 5,799,652 respectively filed Dec. 3, 2003, Jul. 19, 2005, Aug. 8, 2005, Dec. 28, 2000, May 11, 2001, Apr. 17, 2000, May 17, 1997 and Jul. 21, 1995.

FIELD OF THE INVENTION AND PRIOR ART

The present invention introduces a method of producing comfortable human-breathable hypoxic atmospheres within confined compartments. Hypoxic environments described in earlier patents provided above being currently used for hypoxic training and therapy, and fire prevention worldwide—sufficient information can be obtained from www.hypoxico.com and www.firepass.com.

However, in many cases the capacity of hypoxic generators producing such environments does not allow to provide sufficient ventilation rate in order to effectively remove carbon dioxide, water vapor and odors produced by occupants, especially during hypoxic exercise or heavy physical work load. In order to reduce carbon dioxide and water content in such environments, either the capacity (and cost) of the generators must be increased or separate air treatment systems utilizing mostly chemicals needs to be installed.

Current invention allows saving on manufacturing, servicing and energy cost by providing a method and a single system that will:
  Produce healthy hypoxic atmosphere for a human user or an animal
  Remove excessive carbon dioxide and water vapor from the environment
  Control oxygen and carbon dioxide content within preset parameters
  Significantly reduce the size, cost and energy consumption of the equipment needed With its mode of action based on producing and maintaining hypoxic environment within a range of preset parameters of oxygen and carbon dioxide content and desired humidity, this human-friendly system is completely non-toxic, simple and reliable. Consequently, this method is ideally suited to provide a comfortable for respiration environment with oxygen content between 10% and 20.9% and carbon dioxide content in the range from 0.0035% to 3%, for applications that may include fire prevention or hypoxic training and therapy, etc. Alternatively, this method of carbon dioxide and moisture removal can be applied to normoxic and hyperoxic environments as well.

DESCRIPTION OF THE INVENTION

Figure 1:
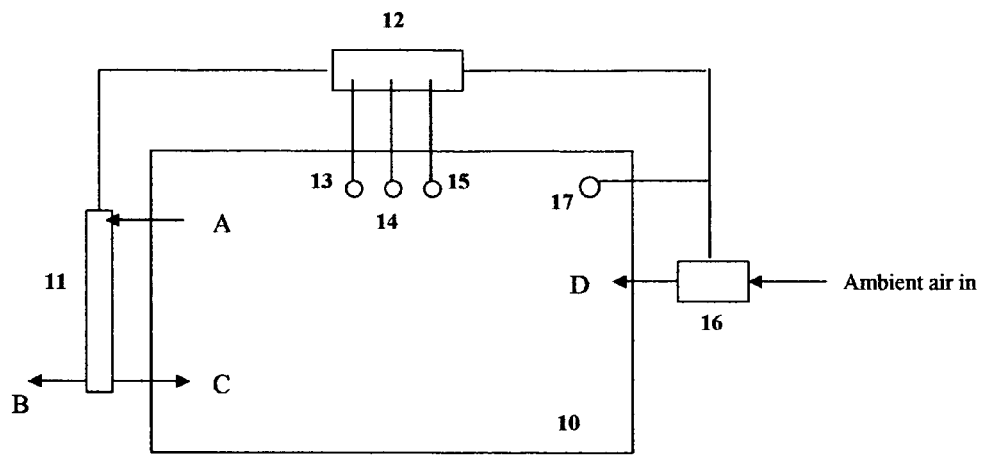
FIG. 1 presents a schematic view of the first preferred embodiment of the system for controlling carbon dioxide and moisture in an enclosed environment

This reliable and low-cost solution will allow designing and building environmentally friendly, cost- and energy-efficient systems for producing and maintaining hypoxic environments in occupied enclosed compartments.

The invented equipment producing such environments can be used for fire prevention inside of an aircraft and ground vehicles, submarines, space vehicles and stations, data centers, archives, warehouses and other occupied structures. Additionally, it can be used for simulating altitude for athletic or equine training or therapy, weight loss and other wellness application benefiting from exposure to hypoxic atmospheres. The invented method can be also applied for controlling carbon dioxide and moisture in normoxic and hyperoxic enclosed environments.

The invention utilizes a special air separation device 11 that recycles internal atmosphere from the enclosed environment 10. The device 11 draws internal air via inlet A and extracts from it a gas mixture rich enriched with carbon dioxide, water vapor and some oxygen, and disposing this gas mixture via outlet B. The remaining fraction, which is reduced in carbon dioxide, water and oxygen, returns back into environment 10. The loss of the internal atmosphere will be compensated for hermetic environments by fresh ambient air sent by air-supply device (e.g. blower or fan) 16 via inlet D. In this case device 16 can be operated by a pressure transducer 17 and/or by a control panel 12. In semi-airtight compartments fresh air supply can occur automatically leaking through holes and gaps in the compartment structure. The driving force of this automatic fresh air supply will be the pressure difference due to extraction of carbon dioxide and moisture enriched gas mixture from the compartment. Device 16 and transducer 17 should be eliminated in this case.

The environment 10 should be slightly pressurized in applications such as aircraft, military vehicles or data centers in order to prevent the loss of the atmosphere in aircraft or to prevent dust and contaminants from entering the environment 10.

Control panel 12 is equipped with oxygen sensor 13, carbon dioxide sensor 14 and humidity sensor 15. Additionally it can be equipped with temperature control as described in earlier patents and other gas sensors, such as ammonia sensor for equine stables, etc.

Using feedback data from sensors 13, 14 and 15 and preset values, control panel can achieve and maintain a desired hypoxic environment condition by controlling the flow of the fresh air supply via device 16 and operation of the device 11.

Figure 2:
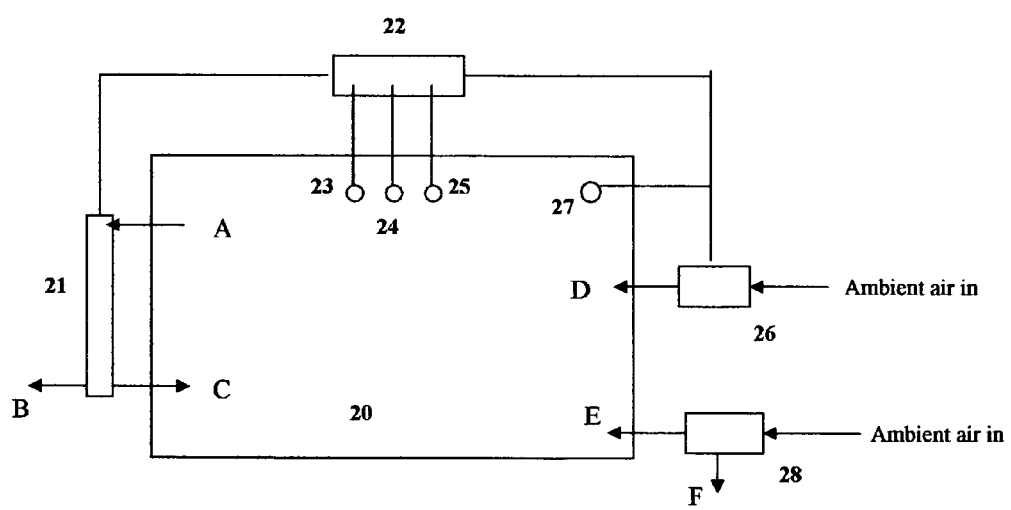
FIG. 2 illustrates an alternate embodiment of the system for controlling carbon dioxide and moisture in a hypoxic (or hyperoxic) environment

FIG. 2 shows another embodiment that can be used in application where a quick achievement of hypoxic condition and/or higher degrees of hypoxia desired (e.g. for research or acclimatization purposes). This embodiment utilizes practically the same equipment and has an additional hypoxic generator 28 injecting hypoxic air, when needed, via inlet E, while disposing oxygen enriched fraction via outlet F.

In some cases, fresh air supply device 26 can be eliminated and hypoxic generator 28 can supply hypoxic air with different oxygen content or even ambient air. In some applications, hypoxic generator 28 can be replaced with an oxygen concentrator for producing hyperoxic environment that can also be maintained by removing carbon dioxide and moisture using device 21.

In the embodiment shown on FIG. 2, the air separation device 11 becomes 21 and device 16 becomes 26. An advanced control panel 22, having oxygen sensor 23, carbon dioxide sensor 24 and an optional humidity sensor 25, can control all three devices 21, 26 and 28. An optional pressure transducer 27 may be installed in hermetic compartments. Hypoxic generator 28 has been described in detail by previous patents provided above and the size and capacity of it can be about 30% to 50% of the required in current application.

This system has a valuable benefit of controlling carbon dioxide content in applications where it is essential (e.g. research, simulated altitude training and medical field).

Both, hypoxic generator 28 or device 21 can produce and maintain hypoxic environment even if the compartment 20 is not in use. Once necessary parameters achieved, control panel can turn the system off and on in a cycling manner in order to maintain set parameters.

Once the compartment 20 is in use and CO2 and/or humidity level increases, device 21 starts working, reducing CO2 and/or humidity content to the desired values.

Both embodiments allow to creating a comfortable for respiration environment with oxygen content between 10% and 20.9% and carbon dioxide content in the range from 0.035% to 3%, for applications that may include fire prevention or hypoxic training and therapy, etc. For both embodiments, a dedicated or split air-conditioning system is recommended in most of the applications in order to control temperature of the internal atmosphere.

The air separation device 11 or 21 can be made using a special hollow fiber membrane or special adsorbents, such as carbon molecular sieve, zeolitic crystals, etc. Other air separation techniques can be used, since all of them would work using a much higher permeability rate of water vapor and carbon dioxide versus oxygen or nitrogen. For instance, carbon dioxide is about ten times faster in permeating a membrane or other obstacle than oxygen and water vapor is even faster than CO2. Nitrogen is about 2.5 times slower than oxygen, which allows retaining most of it for producing hypoxic environments. Therefore, most suitable for this purpose are oxygen-enrichment or nitrogen membranes with modified flow/pressure parameters. Even dryer membranes are suitable for producing hypoxic environments since they will also remove carbon dioxide and some oxygen.

The embodiment shown on FIG. 1 can also control oxygen content or even produce normoxic environment. In this case, environment 10 might be not completely airtight and device 16 needs to be adjusted to provide higher ventilation rate.

The most suitable technology for the device 21 is either a membrane, highly permeable for CO2, or zeolitic crystals that can adsorb CO2 in Pressure Swing Adsorption (PSA) process. Such crystals have tiny holes inside, big enough to allow CO2 molecules to enter under a certain pressure, but are small enough to retain them. When pressure drops, CO2 will be released and vented outside. Such crystals can be made by blending either cobalt or zinc with imidazolates. Device 21 equipped with such zeolitic crystals can also be used for maintaining healthy atmosphere in normoxic and hyperoxic environments as well. For instance, this method can be very beneficial for submarines and underwater structures, aircraft and military vehicles, space vehicles and interplanetary stations.

One of the biggest benefits of the invented system is its energy efficiency. For instance, a Hypoxic Room System for 5 people exercising at a time would require at least 2000 liters/min of hypoxic air flow and there still might be a problem with rising carbon dioxide level. Such a system, based on a hollow-fiber membrane technology, would require about 35 KW of power. By using the invented method and system the power consumption can be reduced approximately by 50%.

Energy can be also saved by using this method of carbon dioxide and moisture extraction from hermetic normoxic environments, such as submarines, aircraft, spacecraft, vehicles and other occupied compartments.

The invented system provides a cost- and energy efficient method of maintaining healthy atmospheres in enclosed occupied spaces.

The invention claimed is:

1. A method for producing a hypoxic atmosphere in an enclosed compartment with extraction of excessive carbon dioxide and water vapor out of the internal atmosphere of said compartment, said method comprising:
   recycling of the internal compartment atmosphere through an air-separation device that extracts some carbon dioxide, water vapor and oxygen from it, so that a gas mixture with a reduced oxygen, carbon dioxide and moisture content being returned back into said compartment;
   disposing the extracted fraction of the recycled atmosphere at a location outside of said compartment;
   delivering fresh air into said compartment for compensating the loss of said extracted portion and for controlling the internal atmospheric parameters, selected from but not limited to: internal atmospheric pressure, a content of oxygen, carbon dioxide, moisture, ammonia and other gases that may be produced by a human, animal or equipment inside said compartment;
   controlling internal atmospheric condition using control panel settings and feedback data from sensors to control panel; said sensors measuring said internal atmospheric parameters;
   said method allowing to provide a comfortable for respiration environment with oxygen content between 10% and 20.9% and carbon dioxide content in the range from 0.0035% to 3%.

2. The method of claim 1, wherein said compartment defining an enclosed space that can be a room inside or a part of a building, aircraft, submarine, vehicle or spacecraft or other occupied space or structure; said method specifically applies for fire prevention of enclosed occupied spaces and for simulated altitude training, wellness and hypoxic therapy, including but not limited to equine applications.

3. The method of claim 1, wherein dedicated air-conditioning allows controlling temperature inside said compartment.

4. The method of claim 1, wherein said air separation device employs a hollow fiber membrane highly permeable for carbon dioxide and water.

5. The method of claim 1, wherein said air-separation device employing zeolitic crystals that can adsorb CO2 in Pressure Swing Adsorption (PSA) process; said crystals being made by blending cobalt or zinc with imidazolates.

6. A system for establishing a hypoxic environment in an enclosed compartment with simultaneous extraction and control of carbon dioxide and humidity, said system comprising:
   an air separation device having an inlet and first and second outlets; said inlet being operatively associated with said enclosed compartment, so said device can draw the internal atmosphere from said compartment for recycling;
   said air separation device being capable in extracting some carbon dioxide, moisture and oxygen from said internal atmosphere, so a gas mixture, having a higher carbon dioxide, moisture and oxygen content than said internal atmosphere, being extracted and disposed via said first outlet, and a gas mixture, having lower carbon dioxide, moisture and oxygen content than said internal atmosphere, being send back into said enclosed compartment via said second outlet;
   a fresh air supply device being operatively associated with said compartment in order to supply, when needed, an outside atmospheric air into said compartment;
   said air separation device being operated by a control panel; said control panel being operatively associated, depending on application, with at least one of the sensors that can measure either oxygen, carbon dioxide, ammonia or moisture content inside said compartment, and receiving feedback data from said sensors, which allows operating said air separation device and said fresh air supply device in order to maintain desired atmospheric condition inside said compartment.

7. The system of claim 6 wherein said compartment defining an enclosed space that can be a room inside or a part of a building, aircraft, submarine, vehicle or spacecraft or other occupied space or structure; said system specifically applies for fire prevention of enclosed occupied spaces and for simulated altitude training, wellness and hypoxic therapy, including equine applications.

8. The system of claim 6, wherein said fresh air supply device being holes or gaps allowing leakage of the fresh air into said compartment due to pressure difference.

9. The system of claim 6, wherein said air separation device employs a hollow fiber membrane highly permeable for carbon dioxide and water.

10. The system of claim 6, wherein said air-separation device employing zeolitic crystals that can adsorb CO2 in Pressure Swing Adsorption (PSA) process; said crystals being made by blending either cobalt or zinc with imidazolates.

11. A method for producing a hypoxic atmosphere in an enclosed compartment with extraction of excessive carbon dioxide and water vapor out of the internal atmosphere of said compartment, said method comprising:
   producing hypoxic air by a hypoxic generator and supplying it into said compartment;
   recycling of the internal compartment atmosphere through an air-separation device that extracts some carbon dioxide, water vapor and oxygen from it, so that a gas mixture with a reduced oxygen, carbon dioxide and moisture content being returned back into said compartment;
   disposing the extracted fraction of the recycled atmosphere at a location outside of said compartment;
   controlling internal atmospheric condition using control panel settings and feedback data from sensors to control panel; said sensors measuring at least one of the internal atmospheric parameters, selected from but not limited to: internal atmospheric pressure, a content of oxygen, carbon dioxide, moisture, ammonia and other gases that may be produced by a human, animal or equipment inside said compartment;
   said method allowing to provide a comfortable for respiration environment with oxygen content between 10% and 20.9% and carbon dioxide content in the range from 0.0035% to 3%.

12. The method of claim 11 wherein said compartment defining an enclosed space that can be a room inside or a part of a building, aircraft, submarine, vehicle or spacecraft or other occupied space or structure; said method applies for fire prevention of enclosed occupied spaces and for hypoxic or simulated altitude training, wellness and therapy, including equine applications.

13. A system for establishing a hypoxic environment in an enclosed compartment with extraction and control of carbon dioxide and humidity, said system comprising:
   a hypoxic generator producing hypoxic air from ambient atmosphere outside of said compartment and supplying it into said compartment when needed;
   an air separation device having an inlet and first and second outlets; said inlet being operatively associated with said enclosed compartment, so said device can draw the internal atmosphere from said compartment for recycling;
   said air separation device being capable in extracting some carbon dioxide, moisture and oxygen from said internal atmosphere, so a gas mixture, having a higher carbon dioxide, moisture and oxygen content than said internal atmosphere, being extracted and disposed via said first outlet, and a gas mixture, having lower carbon dioxide, moisture and oxygen content than said internal atmosphere, being send back into said enclosed compartment via said second outlet;
   said hypoxic generator and said air separation device being operated by a control panel;
   said control panel being operatively associated, depending on application, with at least one of the sensors that can measure either oxygen, carbon dioxide, ammonia or moisture content inside said compartment, and receiving feedback data from said sensors, which allows operating said air separation device and said hypoxic generator in order to maintain desired atmospheric condition inside said compartment.

14. The system of claim 13 wherein said compartment defining an enclosed space that can be a room inside or a part of a building, aircraft, submarine, vehicle or spacecraft or other occupied space or structure; said system specifically applies for fire prevention of enclosed occupied spaces and for hypoxic or simulated altitude training, wellness and therapy, including equine applications.

15. A method and a system for removal moisture and carbon dioxide from occupied enclosed compartments, said method and system comprising:
   recycling of the internal compartment atmosphere through an air-separation device that extracts some carbon dioxide and water vapor from it, so that a gas mixture with a reduced carbon dioxide and moisture content being returned back into said compartment;
   disposing the extracted fraction of the recycled atmosphere at a location outside of said compartment;
   delivering fresh air into said compartment, via fresh air supply device, for compensating the loss of said extracted portion and for controlling the internal atmospheric parameters, selected from but not limited to: internal atmospheric pressure, a content of oxygen, carbon dioxide, moisture, ammonia and other gases that may be produced by a human, animal or equipment inside said compartment;
   controlling internal atmospheric condition using control panel and feedback data from sensors to control panel; said sensors measuring said internal atmospheric parameters;
   said method and system allowing to provide a comfortable for respiration environment with carbon dioxide content in the range from 0.0035% to 3% and reduced humidity.

16. The method and the system of claim 15 and an oxygen concentrator supplying oxygen enriched air into said compartment for maintaining normoxic or hyperoxic environment inside.

17. The method and system of claim 15, wherein said air separation device employs a hollow fiber membrane highly permeable for carbon dioxide and water.

18. The method and system of claim 15, wherein said air-separation device employing zeolitic crystals that can adsorb CO2 in Pressure Swing Adsorption (PSA) process; said crystals being made by blending either cobalt or zinc with imidazolates.

* * * * *